United States Patent
Yew et al.

(10) Patent No.: US 9,338,276 B2
(45) Date of Patent: May 10, 2016

(54) GATING ACCESSORY CONNECTION

(75) Inventors: Jason Yew, San Jose, CA (US);
Lawrence Bolton, Fremont, CA (US)

(73) Assignee: Apple Inc., Cupertino, CA (US)

( * ) Notice: Subject to any disclaimer, the term of this patent is extended or adjusted under 35 U.S.C. 154(b) by 514 days.

(21) Appl. No.: 12/892,628

(22) Filed: Sep. 28, 2010

(65) Prior Publication Data

US 2011/0185048 A1 Jul. 28, 2011

Related U.S. Application Data

(60) Provisional application No. 61/298,462, filed on Jan. 26, 2010.

(51) Int. Cl.
*G06F 15/00* (2006.01)
*H04W 36/00* (2009.01)
*H04M 1/725* (2006.01)

(52) U.S. Cl.
CPC ........ *H04M 1/7253* (2013.01); *H04M 1/72527* (2013.01); *H04M 1/72538* (2013.01)

(58) Field of Classification Search
CPC ..................... H04M 2250/02; H04M 1/72572; H04M 2250/10; H04W 48/18
USPC ................. 709/220, 221, 222, 230, 231, 235; 715/716; 455/455; 707/104.1
See application file for complete search history.

(56) References Cited

U.S. PATENT DOCUMENTS

| | | | |
|---|---|---|---|
| 6,128,657 A * | 10/2000 | Okanoya et al. | 709/224 |
| 6,233,448 B1 | 5/2001 | Alperovich | |
| 6,294,995 B1 | 9/2001 | Patterson | |
| 6,653,816 B2 | 11/2003 | Peek | |
| 7,313,615 B2 * | 12/2007 | Fitzpatrick et al. | 709/223 |
| 7,539,175 B2 * | 5/2009 | White et al. | 370/350 |
| 7,623,879 B2 * | 11/2009 | Honkanen et al. | 455/501 |
| 7,779,097 B2 * | 8/2010 | Lamkin et al. | 709/223 |
| 7,848,527 B2 * | 12/2010 | Dorogusker et al. | 381/55 |
| 8,787,955 B2 * | 7/2014 | Aoyagi | 455/508 |
| 2002/0099828 A1 * | 7/2002 | Darby | 709/227 |
| 2002/0195997 A1 * | 12/2002 | Peek et al. | 320/134 |
| 2003/0055977 A1 * | 3/2003 | Miller | 709/227 |
| 2003/0220988 A1 * | 11/2003 | Hymel | 709/220 |
| 2004/0030749 A1 * | 2/2004 | Bowman-Amuah | 709/204 |
| 2004/0137890 A1 * | 7/2004 | Kalke | 455/418 |
| 2004/0185774 A1 | 9/2004 | Scott | |
| 2005/0064911 A1 | 3/2005 | Chen | |
| 2006/0043175 A1 | 3/2006 | Fu | |
| 2006/0094442 A1 * | 5/2006 | Kirkup et al. | 455/455 |

(Continued)

*Primary Examiner* — Aftab Nasir Khan
(74) *Attorney, Agent, or Firm* — Kilpatrick Townsend & Stockton, LLP

(57) ABSTRACT

Embodiments of the invention can manage the activity of accessories connected to a mobile computing device. A mobile computing device can be connected to any number of accessories through wireless or physical connections. Processing and resource limitations at the mobile computing device limit the number of accessories that can feasibly interoperate with the mobile computing device at any one time. In some embodiments, a threshold value is placed on the number of accessories with which a mobile computing device can interoperate at any one time. This threshold value can depend on the types of accessories, the application(s) executing on the mobile computing device, the processing power, whether media output resource are being used, etc. In response to a threshold number of accessories being connected, the mobile computing device can deactivate accessories.

22 Claims, 10 Drawing Sheets

(56) References Cited

U.S. PATENT DOCUMENTS

| | | | |
|---|---|---|---|
| 2006/0135076 A1* | 6/2006 | Honkanen et al. | 455/67.13 |
| 2006/0160562 A1 | 7/2006 | Davis | |
| 2006/0242441 A1* | 10/2006 | Yoon et al. | 713/320 |
| 2007/0016813 A1 | 1/2007 | Naitou | |
| 2007/0271387 A1* | 11/2007 | Lydon et al. | 709/230 |
| 2008/0030588 A1 | 2/2008 | Boss | |
| 2008/0065234 A1* | 3/2008 | Igoe | 700/1 |
| 2008/0081605 A1* | 4/2008 | Cole | 455/424 |
| 2008/0082647 A1* | 4/2008 | Baker | 709/223 |
| 2008/0165750 A1* | 7/2008 | Kim | 370/338 |
| 2008/0240058 A1* | 10/2008 | Hansen et al. | 370/338 |
| 2008/0270814 A1 | 10/2008 | Starr | |
| 2008/0314994 A1 | 12/2008 | Faith | |
| 2008/0320190 A1* | 12/2008 | Lydon et al. | 710/106 |
| 2009/0082011 A1* | 3/2009 | Zhang et al. | 455/426.1 |
| 2009/0138507 A1* | 5/2009 | Burckart et al. | 707/104.1 |
| 2009/0191922 A1* | 7/2009 | Rokusek et al. | 455/569.2 |
| 2009/0203363 A1 | 8/2009 | Isobe | |
| 2009/0221240 A1 | 9/2009 | Zhang | |
| 2010/0011113 A1* | 1/2010 | Pedersen | 709/229 |
| 2010/0123980 A1* | 5/2010 | Lee | 361/23 |
| 2010/0146076 A1* | 6/2010 | Adriazola et al. | 709/219 |
| 2010/0235739 A1* | 9/2010 | Rathi et al. | 715/716 |
| 2010/0293598 A1* | 11/2010 | Collart et al. | 726/3 |
| 2011/0280403 A1* | 11/2011 | DeLuca | 380/278 |
| 2012/0077505 A1* | 3/2012 | Wietfeldt et al. | 455/450 |
| 2012/0264444 A1* | 10/2012 | Yu | 455/450 |
| 2012/0317194 A1* | 12/2012 | Tian | 709/204 |
| 2012/0329441 A1* | 12/2012 | Tseng | 455/418 |
| 2013/0163547 A1* | 6/2013 | Deu-Ngoc et al. | 370/329 |

* cited by examiner

| Active/inactive accessory lookup table | | | 310 |
| --- | --- | --- | --- |
| Port # | Acc. Info | Active? | Connection Time |
|  |  |  |  |

*FIG. 3*

Video playback accessory lookup table 410 port{a} ↔ active ↔ resolution ↔ coding ↔ aspect ratio ↔ screen size ↔ format ↔ rank ↔ connection time port{b} ↔ active ↔ resolution ↔ coding ↔ aspect ratio ↔ screen size ↔ format ↔ rank ↔ connection time port{c} ↔ inactive ↔ resolution ↔ coding ↔ aspect ratio ↔ screen size ↔ format ↔ rank ↔ connection time port{d} ↔ inactive ↔ resolution ↔ coding ↔ aspect ratio ↔ screen size ↔ format ↔ rank ↔ connection time port{e} ↔ active ↔ resolution ↔ coding ↔ aspect ratio ↔ screen size ↔ format ↔ rank ↔ connection time

*FIG. 4*

GATING ACCESSORY CONNECTION

CROSS REFERENCE

This application claims the benefit of U.S. Provisional Patent Application No. 61/298,462, entitled "Gating Accessory Connection," filed Jan. 26, 2010, the entire disclosures of which are incorporated herein by reference for all purposes.

BACKGROUND

In recent years, a number of mobile computing devices have been developed. Examples of mobile computing devices include portable media players, mobile phones, personal digital assistants, portable e-mail devices, video game players, portable navigation units relying on Global Positioning System satellite data, and multi-function devices that can integrate numerous functions such as media storage and playback, mobile phone, Internet access, e-mail, personal information management, game play, GPS/navigation capability, and the like. Examples of multi-function mobile computing devices include various iPad®, iPhone®, and iPod® models manufactured and sold by Apple Inc., assignee of the present application, as well as other portable electronic devices made and sold by other manufactures and distributors under their respective brand names.

A mobile computing device can be connected to any number of accessories through wireless or physical connections. Processing and resource limitations on the mobile computing device limit the number of accessories that can feasibly interoperate with the mobile computing device at any one time. And for any number of reasons a threshold can be placed on the number of accessories with which a mobile computing device can interoperate.

BRIEF SUMMARY

Embodiments of the present invention manage the active and inactive states of accessories connected with a mobile computing device. In doing so, the mobile computing device can control which accessories the mobile computing device interoperates with. In some embodiments, accessories can be deactivated in response to a triggering event. Examples of a triggering event can include a user request, audio playback, video playback, execution of an application on (or by) the mobile computing device or the accessory, the closing of an application on (or by) the mobile computing device or the accessory, an illegal command or message from the accessory, a request from an accessory, an action from the user detected through a user interface, an action presented by another accessory, memory usage exceeding a threshold, processing usage exceeding threshold, and/or processing congestion, to name a few. When an accessory becomes inactive, the accessory discontinues communication with the mobile computing device. In some embodiments, the accessory can request reactivation or be reactivated based on some other event.

In some embodiments, a first accessory can be connected with a mobile computing device and can be interacting with the mobile computing device. A second accessory can then be connected with the mobile computing device. In some embodiments, both the first accessory and the second accessory can include video playback functionality. The video playback capabilities of the first and second accessories can be sent to the mobile computing device. In some embodiments, the mobile computing device can deactivate the first accessory and send video data only to the second accessory. In some embodiments, this can be done, for example, because each accessory may require different video output standards or because the second accessory can provide higher playback quality. In order to avoid conflicts between standards and accessories the mobile computing device can inactive one of the two accessories to avoid any problems. Accessories can be deactivated for reasons other than video playback.

The following detailed description together with the accompanying drawings will provide a better understanding of the nature and advantages of the present invention.

BRIEF DESCRIPTION OF THE DRAWINGS

FIG. 3 shows an example of an active/inactive accessory lookup table according to some embodiments of the invention.

FIG. 4 shows an example of a video playback lookup table according to some embodiments of the invention.

DETAILED DESCRIPTION

Figure 1:
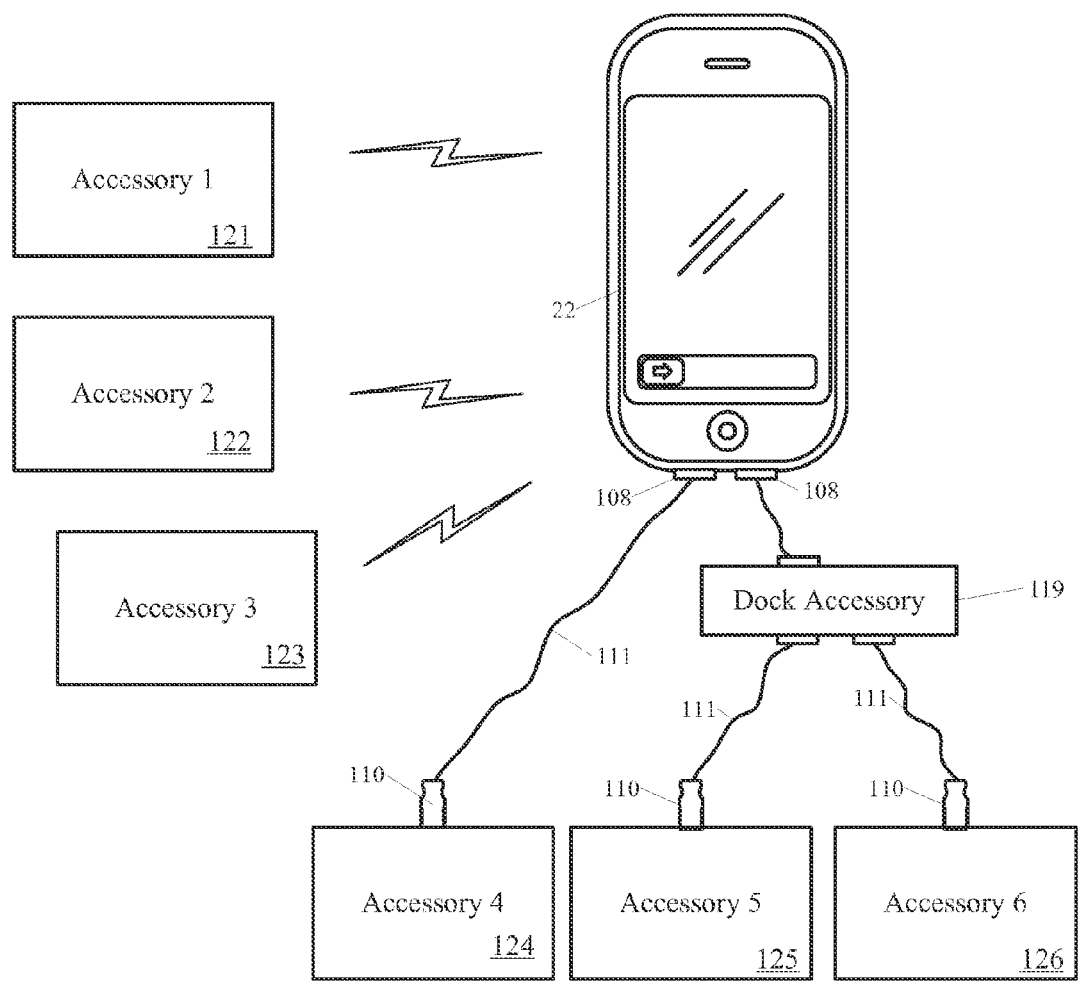
FIG. 1 shows a mobile computing device connected with a number of accessory devices according to some embodiments of the invention.

Embodiments of the invention allow a mobile computing device to activate and deactivate accessories depending on the occurrence of any number of events. In doing so the mobile computing device can be in control of which accessories it is interacting with. This can provide a number of benefits. For example, interacting with a number of accessories can be computationally challenging for the mobile computing device. By placing some accessories in an inactive state, the mobile computing device can reduce its computational load. As another example, the mobile computing device can limit audio or video output to a single accessory rather than sending such media to a number of accessories. For instance, when the media presentation can vary by format between accessories, the mobile computing device can provide the media presentation to a single accessory in the proper format. As yet another example, having multiple accessories interoperating with a mobile computing device can tax various resources of the mobile computing device; for example, when the memory, battery, processing, network bandwidth, etc. can be taxed. In response, the mobile computing device can deactivate one or more accessories in order to preserve mobile computing device resources. Various other benefits can be derived from deactivating an accessory. In some embodiments, an accessory resource can be deactivated while another accessory resource remains active. In some embodiments, an accessory can be deactivated when another accessory that provides the same or similar functionality is connected through a different port that has increased communication bandwidth. In some embodiments, an accessory can be deactivated when an application executed on the mobile computing device is terminated, or when an application on the mobile computing device executes in the background.

As used through this disclosure, the term "active accessory" refers to an accessory that is connected with a mobile computing device and is actively communicating or interoperating with a mobile computing device. The term "inactive accessory" refers to an accessory connected with the mobile computing device that has been blocked from communicating or interoperating with the mobile computing device. In some embodiments, an inactive accessory can send and/or receive a status query and/or an update message to or from a mobile computing device and still remain an inactive accessory. A status query and/or update message may be sent infrequently. In some embodiments, an inactive accessory can be self regulated. That is, in response to receiving a deactivation command the accessory can simply obey the command and cease interaction with the mobile computing device. The accessory can enter a shut down or sleep mode when deactivated, or the accessory can simply cease communicating with the mobile computing device altogether. The term "connection attempt" refers to an accessory command (or message or interaction) that can be used to request establishment of a communication link between the accessory and the mobile computing device.

FIG. 1 shows a mobile computing device 22 connected with six accessory devices 121, 122, 123, 124, 125, and 126. Accessories 121, 122, and 123 are wirelessly connected with mobile computing device 22. Accessory 124 is directly connected with mobile computing device. Accessories 125 and 126 are connected to the mobile computing device 22 in an indirect fashion using dock accessory 119. Cables 111 can include connectors 28 that can be used to connect with mobile computing device 22 and connector 110 to connect with accessory device 113. Various other configurations can be used. Moreover, more or fewer accessories may be connected with a mobile computing device.

The mobile computing device shown in FIG. 1 can be any type of mobile computing and/or communication device without limitation. For example, an iPad, an iPod Touch™, an iPhone™, an Android compatible device and/or a Blackberry device can be used. The mobile computing device 22 can also include a laptop or tablet computer. Moreover, mobile computing device 22 can provide media player capability, networking, web browsing, email, word processing, data storage, application execution, and/or any other computing or communication functions.

Each of accessories 121, 122, 123, 124, 125, and 126 can be any device capable of communicating with mobile computing device 22 such as, for example, an external speaker system; an external video device; a multimedia device; a consumer electronic device; a test instrument; a home appliance (e.g., refrigerator, coffee maker, or dishwasher); exercise equipment; a security system (e.g., alarms systems, cameras, intrusion sensors, etc.); a home or office automation system (e.g., thermostat, A/C or heat control device, sprinkler system, etc.); a camera; a user input device (e.g., keyboard, mouse, game controller, etc.); a measurement device; a medical device (e.g., glucose monitor, hearing aid, prosthesis feedback or control device, or insulin monitor); a point of sale device; an automobile; an automobile accessory (e.g., a car stereo system or car navigation system); a radio (e.g., FM, AM and/or satellite); an entertainment console on an airplane, bus, train, or other mass transportation vehicle; a television; a computer; etc. Any type of device that can be used in conjunction with a mobile computing device can be used as an accessory device.

Figure 2:
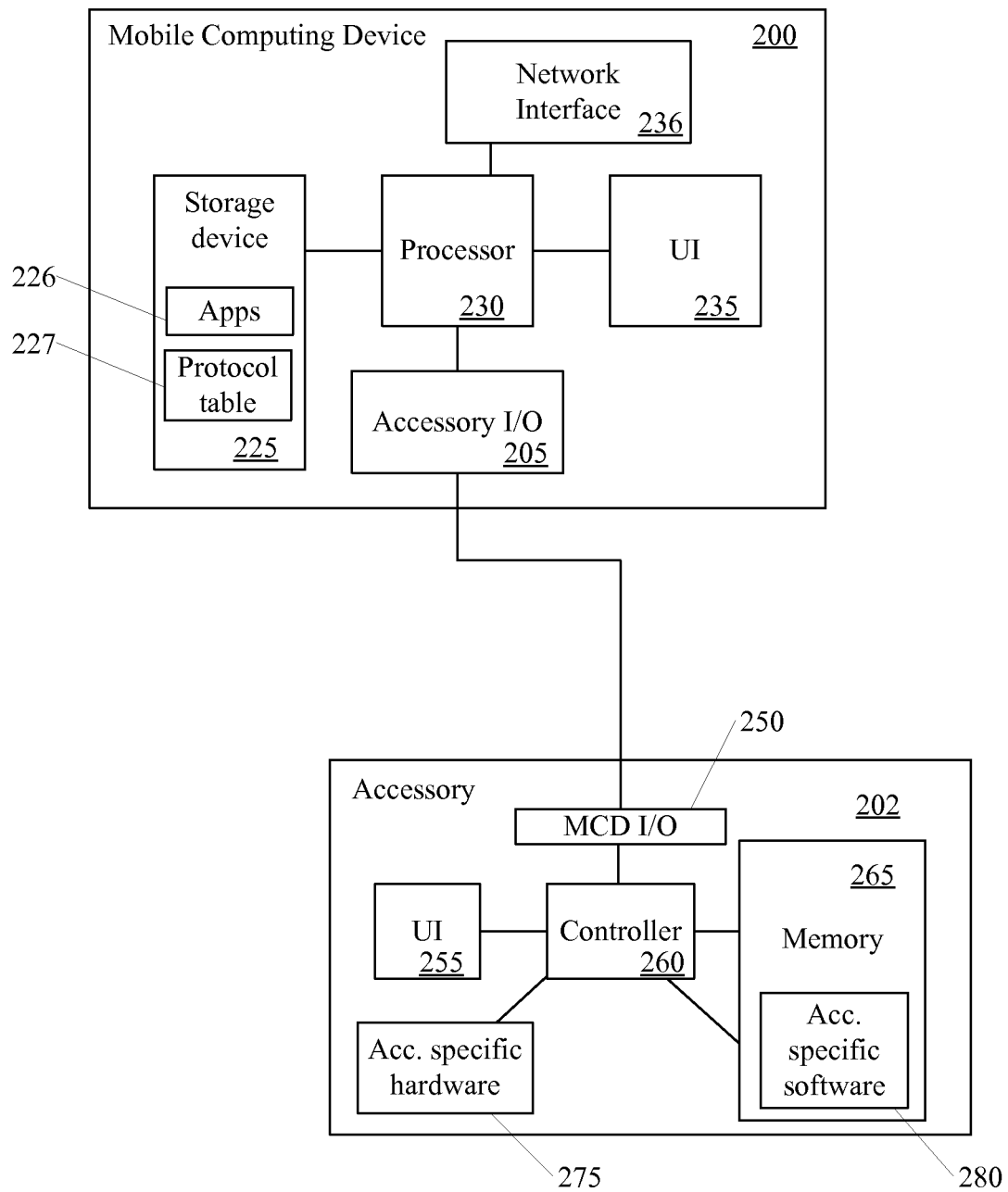
FIG. 2 shows a block diagram of a mobile computing device connected with an accessory according to one embodiment of the invention.

FIG. 2 shows a block diagram of mobile computing device 200 (e.g., implementing mobile computing device 22 of FIG. 1) connected with accessory 202 (e.g., implementing any or all of accessories 121, 122, 123, 124, 125, and/or 126 of FIG. 1) according to one embodiment. While only a single accessory is shown, any number of accessories can be connected with mobile computing device 200 either wirelessly or with a physical connection.

Mobile computing device 200 can include processor 230, storage device 225, user interface (UI) 235, network interface 236, and accessory input/output (I/O) interface 205.

Processor 230, which can be implemented as one or more integrated circuits (including, e.g., a conventional microprocessor or microcontroller), can control the operation of mobile computing device 200. For example, in response to user input signals provided by user interface 235, processor 206 can perform various tasks such as selecting and playing media assets that may be stored in storage device 225; accessing various networks (e.g., a mobile telephone network, the Internet, local area network, or the like) to send and/or retrieve data using network interface 236; executing various application programs 226 residing on storage device 225; and so on. Processor 230 can also manage communication with accessories via accessory I/O interface 205.

User interface 235 can include input controls such as a touch pad, touch screen, scroll wheel, click wheel, dial, button, keypad, microphone, etc., as well as output devices such as a display screen, indicator lights, speakers, headphone jacks, etc., together with supporting electronics (e.g., digital-to-analog or analog-to-digital converters, signal processors or the like). A user can operate the various input controls of user interface 235 to invoke the functionality of mobile computing device 200 and can also view and/or hear output from mobile computing device 200 via user interface 235.

Storage device 225 may be implemented, e.g., using disk, flash memory, or any other non-volatile storage medium. Storage device 225 can store application programs 226 that are executable by processor 230, system programs and other program code (not explicitly shown), and various data such as protocol table 227 that can be used in managing communication with various accessories, as described below. In some embodiments, storage device 225 can also store media assets such as audio, video, still images, or the like, that can be played by mobile communication device 200, along with metadata describing the media assets (e.g., asset name, artist, title, genre, etc.), playlists (lists of assets that can be played sequentially or in random order), and the like. Storage device 225 can also store any other type of information such as information about a user's contacts (names, addresses, phone numbers, etc.); scheduled appointments and events; notes; and/or other personal information.

Application programs (also referred to herein as "applications") 226 can include any program executable by processor 230. In some embodiments, certain applications can be installed on mobile computing device 200 by its manufacturer, while other applications can be installed by a user. Examples of application programs can include video game programs, personal information management programs, programs for playing media assets and/or navigating the media asset database, programs for controlling a telephone interface to place and/or receive calls, and so on. Certain application programs 226 may provide communication with and/or control of accessory 202, and certain application programs 226 may be responsive to control signals or other input from accessory 202.

Network interface 236 can provide an interface to one or more communication networks. For example, network interface 236 can incorporate a radio-frequency (RF) transceiver and suitable components for communicating via a mobile communication network such as a mobile telephone network. Additionally or instead, network interface 236 can incorporate a wireless connection to the Internet (e.g., a WiFi transceiver, 3G transceiver or the like), to a personal area network (e.g., a Bluetooth network), or any other network. In still other embodiments, a wired network connection (e.g., Ethernet) may be provided. In some embodiments, the same hardware can be used to support connections to multiple networks; thus, network interface 236 can include analog-to-digital and/or digital-to-analog circuitry, baseband processing components (e.g., codecs, channel estimators, and the like), modulators, demodulators, oscillators, amplifiers, transmitters, receivers, transceivers, internal and/or external antennas, and so on. In some embodiments, some operations associated with network connectivity can be implemented entirely or in part as programs executed on processor 230 (e.g., encoding, decoding, and/or other processing in the digital domain), or a dedicated digital signal processor can be provided.

Accessory I/O interface 205 can include a number of signal paths configured to carry various signals between mobile computing device 200 and accessory 202. In one embodiment, accessory I/O interface 205 includes a 30 pin connector corresponding to the connector used on iPod® and iPhone™ products manufactured and sold by Apple Inc.; other connectors can also be used. Alternatively or additionally, accessory I/O interface 205 can include a wireless interface (e.g., Bluetooth or the like).

In some embodiments, mobile computing device 200 can also use accessory I/O interface 205 to communicate with a host computer (not shown) that executes an asset management program that can provide media and/or applications for a mobile computing device (for example, iTunes® or Microsoft's application store). The asset management program can enable a user to add media assets and/or applications to mobile computing device and/or remove media assets from mobile computing device 200. The user can update metadata associated with media assets on mobile computing device 200. In some embodiments, the user can also interact with the asset management program to create and update playlists and/or applications as well as other documents. In one embodiment, the host computer maintains a master database of media assets and/or applications and can access other databases, for example, through the Internet (including associated metadata and playlists), and the asset management program synchronizes the master database with the database maintained on storage device 225 of mobile computing device 200 automatically whenever mobile computing device 200 connects to the host computer. In other embodiments, mobile computing device 200 can use network interface 236 to communicate with a host computer and/or directly with various other servers to acquire applications, media assets and/or other data.

Accessory 202 can include controller 260, user interface 255, mobile computing device I/O interface 250, memory 265, and accessory specific hardware 275.

Mobile computing device I/O interface 250 can include a number of signal paths configured to carry various signals between accessory 202 and mobile computing device 200. In one embodiment, mobile computing device I/O interface 250 can include a connector adapted to mate with the 30-pin connector used on iPod® and iPhone™ products manufactured and sold by Apple Inc. Other connectors can also be used; for example, mobile computing device I/O interface 250 can include a standard USB, UART, or FireWire connector or the like. Alternatively or additionally, mobile computing device I/O interface 250 can include a wireless interface (e.g., Bluetooth or the like).

Controller 260 can include, e.g., a microprocessor or microcontroller executing program code to perform various functions such as digital audio decoding, analog or digital audio and/or video processing, processing of user input, controlling of accessory functionality and the like. Controller 260 can also manage communication with a mobile computing device via mobile computing device I/O interface 250.

User interface 255 can include input controls, such as a touch pad, touch screen, scroll wheel, click wheel, dial, button, keypad, microphone, probes, etc., as well as output devices, such as a video screen, indicator lights, speakers, headphone jacks or the like, together with supporting electronics (e.g., digital-to-analog or analog-to-digital converters, signal processors or the like). A user can operate the various input controls of user interface 255 to invoke the functionality of accessory 202 and can view and/or hear output from accessory 202 via user interface 255. In addition, in some embodiments, a user can operate mobile computing device 200 (or applications executing thereon) via accessory user interface 255.

Memory 265 can be implemented using any type of memory, disk, or other storage medium that can store program code for controller 260 and/or data. For example, memory 265 can store accessory specific software 280 that can provide instructions for controller 260 to interact with accessory specific hardware 275, and/or user interface 255. In some embodiments, accessory 202 can receive information (e.g., user input, metadata, and/or application data) from mobile computing device 200, and such information can also be stored in memory 265.

Accessory specific hardware 275 can represent any hardware needed to enable desired functionality of accessory 202. For example, accessory specific hardware 275 can include one or more data gathering devices, such as any type of sensor or meter. In some embodiments, accessory specific hardware 275 can include an electrical meter that generates data representing electrical characteristics (resistance, voltage difference, or the like); a light sensor that detects light and/or patterns of light; a motion sensor; a temperature sensor; a humidity sensor; a pressure sensor; a chemical sensor that responds to the presence of selected chemicals (e.g., potentially toxic gases such as carbon monoxide); and so on. Accessory specific hardware 275 can also include one or more medical device such as a glucose meter, respiratory meter, heart rate and/or heart function monitor, blood pressure monitor, or the like.

In some embodiments, accessory specific hardware 275 that includes a data-gathering device can provide one or more electrical signals (e.g., voltage, resistance, and/or current) that correspond to or represent the physical data. Analog and/or digital signals in a variety of formats may be used. Accessory specific hardware 275 can also include signal processing components that process the signal before sending it to controller 260; in some embodiments, accessory specific hardware 275 can send the electrical signal directly to controller 260, which can process the signal. For example, if accessory specific hardware 275 includes a thermometer implemented using a thermocouple, resistance data from the thermocouple can be converted into temperature data by accessory specific hardware 275, by controller 260, or both. Further, signals representing data gathered by accessory specific hardware 275 can be sent (with or without processing by controller 260) to an application executing on mobile computing device 200, e.g., using an application protocol as described below; thus an application executing on mobile computing device 200 can also process data gathered using accessory specific hardware 275.

In some embodiments, accessory specific hardware 275 can include one or more computer-controllable devices. Examples of computer-controllable devices include motors, actuators, lights, cameras, valves, speakers, display screens, printers, and/or any other equipment that is controllable by controller 260. In some embodiments, an application executing on mobile computing device 200 can send control signals to accessory 202, and controller 260 can operate accessory specific hardware 275 in response to the control signals.

In some embodiments, accessory specific hardware 275 can include components of user interface 255. Thus, an application executing on mobile computing device 200 can receive user input from accessory 202, provide output to a user via accessory 202, and/or control, interact with, or respond to any operation accessory 202 is capable of performing.

In some embodiments, accessory specific hardware 275 can include network and/or communication interfaces. For example, accessory specific hardware 275 can include an RF receiver (e.g., for FM, AM, satellite radio, and/or other bands) and/or an RF transmitter (e.g., a short-range transmitter for personal use). In other embodiments, accessory specific hardware 275 can include a communication interface to a personal area network, such as a Bluetooth transceiver or other short-range wireless communication interface. In still other embodiments, accessory specific hardware 275 can include a telephone interface, GSM, CDMA, and/or other voice and/or data network interfaces.

Accordingly, accessory specific hardware 275 can encompass any hardware component for which interoperability with a mobile computing and/or communication device may be desirable.

It will be appreciated that the system configurations and components described herein are illustrative and that variations and modifications are possible. The mobile computing device and/or accessory may have other capabilities not specifically described herein. While accessory 202 and mobile computing device 200 are described herein with reference to particular blocks, it is to be understood that the blocks are defined for convenience of description and are not intended to imply a particular physical arrangement of component parts. Further, the blocks need not correspond to physically distinct components.

Accessory I/O interface 205 of mobile computing device 200 and mobile computing device I/O interface 250 of accessory 202 allow mobile computing device 200 to be connected to accessory 202 and subsequently disconnected from accessory 202. As used herein, mobile computing device 200 and accessory 202 are "connected" whenever a communication channel between accessory I/O interface 205 and mobile computing device I/O interface 250 is open and are "disconnected" whenever the communication channel is closed. Connection can be achieved by physical attachment (e.g., between respective mating connectors of mobile computing device 200 and accessory 202), by an indirect attachment such as a cable, or by establishing a wireless communication channel. Similarly, disconnection can be achieved by physical detachment, disconnecting a cable, powering down accessory 202 or mobile computing device 200, or closing the wireless communication channel. Thus, a variety of communication channels may be used, including wired channels such as Universal Serial Bus ("USB"), FireWire (IEEE 1394 standard), or universal asynchronous receiver/transmitter ("UART"), or wireless channels such as Bluetooth (a short-range wireless communication standard developed by the Bluetooth SIG and licensed under the trademark Bluetooth®), WiFi (adhering to any of the IEEE 202.11 family standards), wireless personal area network, infrared, or the like. In some embodiments, communication can occur using both a wired and a wireless channel. In some embodiments, multiple communication channels between a mobile computing device and an accessory can be open concurrently, or a mobile computing device can be concurrently connected to multiple accessories, with each accessory using a different communication channel.

Regardless of the particular communication channel, as long as mobile computing device 200 and accessory 202 are connected to each other, the devices can communicate by exchanging commands and data as specified by an accessory communication protocol. The accessory communication protocol can define a format for sending messages between mobile computing device 200 and accessory 202. For instance, the accessory communication protocol may specify that each message is sent in a packet with a header, a payload, and/or a tail. The header can provide basic information such as a start indicator, length of the packet, and a command to be processed by the recipient, while the payload provides any data associated with the command; the amount of associated data can be different for different commands, and some commands may provide for variable-length payloads. The packet can also include a tail that may provide error-detection or error-correction codes, e.g., as known in the art, and/or other information as desired. In various embodiments, the accessory communication protocol can define specific commands to indicate an action to be taken by the recipient; to signal completion of a task, change of state, or occurrence of an error; and/or to identify the nature of the associated data. In some embodiments, the commands may be defined such that any particular command is valid in only one direction.

The accessory communication protocol can also specify one or more physical transport links usable for transmitting signals between devices. For example, the transport link can be a USB link, a UART link, a FireWire link, a Bluetooth link, a WiFi link, a parallel link, a serial link, etc. At this level, the accessory communication protocol can specify, e.g., start bytes, sync bytes, stop bytes, and/or other auxiliary signals. In some embodiments, the accessory communication protocol can provide for multiple alternative transport links; thus a single mobile computing device can support communication over a variety of physical links including wired and/or wireless links.

The accessory communication protocol can define a number of "lingoes," where a "lingo" refers generally to a group of related commands that can be supported (or unsupported) by various classes of accessories. In one embodiment, a command can be uniquely identified by a first byte identifying the lingo to which the command belongs and a second byte identifying the particular command within the lingo. Other command structures may also be used. It is not required that all accessories, or all mobile computing devices to which an accessory can be connected, support every lingo defined within the accessory communication protocol or every command of a particular lingo (for instance, different devices might use different versions of a given lingo).

In some embodiments, every accessory 202 and every mobile computing device 200 that is designed to interoperate with each other can support at least a "general" lingo that includes commands common to all such devices. The general lingo can include commands enabling the mobile computing device and the accessory to identify themselves to each other and to provide at least some information about their respective capabilities, including which (if any) other lingoes each supports and which capabilities of the other device each intends to use while connected. The capabilities, for example, can also include information specifying video playback features of the accessory and/or audio playback features that can be used by the mobile computing device to make decisions regarding whether to deactivate the accessory.

The general lingo can also include authentication commands that the mobile computing device can use to verify the purported identity and capabilities of the accessory (or vice versa), and the accessory (or mobile computing device) may be blocked from invoking certain commands or lingoes if the authentication is unsuccessful. For example, an authentication manager (not shown) within mobile computing device 200 can communicate with an authentication controller (also not shown) within accessory 202 to perform an authentication procedure, e.g., based on public key cryptography and a store of digital certificates maintained within the authentication manager of mobile computing device 200.

The general lingo or another lingo of the accessory communication protocol can also include "tunnel" commands that allow an exchange of arbitrary information between an application 226 executing on mobile computing device 200 and accessory 202. For example, a TunnelToAcc command can be defined as being sendable by mobile computing device 200 to accessory 202. The payload of this command can be any data, control signals, or other information that an application 226 executing on mobile computing device 200 can generate and send to accessory 202. Similarly, a TunnelToHost command can be defined as being sendable by accessory 202 to mobile computing device 200. The payload of this command can be any data, control signals, or other information that accessory 202 can generate and send to an application 226 executing on mobile computing device 200. These tunnel commands can be defined such that the accessory communication protocol is agnostic as to the payload content.

An accessory communication protocol supported by a mobile computing device and an accessory can include various other lingoes, such as a simple remote lingo that allows the accessory to send a command indicating a function of the mobile computing device to be invoked, a remote user interface lingo that can be used to communicate commands and data related to replicating all or part of a user interface of the mobile computing device on the accessory (thereby supporting a more advanced remote control), a tuner lingo that allows a user to control a tuner accessory by operating the mobile computing device, a storage lingo that allows the accessory to store data on the mobile computing device, and so on. Any lingo or combination of lingoes or other commands or groups of commands can be used in connection with embodiments described herein.

In some embodiments, the accessory can communicate with an API associated with one or more applications at the mobile computing device using an application communication protocol. For example, such communication can use the "tunnel" command discussed above. In some embodiments, the accessory can communicate with an API associated with one or more application using the accessory communication protocol. In other embodiments, the accessory can also communicate with the mobile computing device operating system using either or both of the accessory communication protocol and/or the application communication protocol.

It will be appreciated that the accessory communication protocol described herein is illustrative and that variations and modifications are possible. Specific commands described herein can be replaced with other commands or combination of commands or other types of messages and formats. In addition, it is not required that all of the commands and operations described herein be supported by any particular mobile communication device or accessory.

As noted above, application 226 executing on mobile computing device 200 and accessory 202 can exchange arbitrary data, control signals, and/or other information (also referred to herein as "messages"). These messages can relate to a wide variety of circumstances. For example, messages relating to user input events, detected external conditions, received data or any other events or conditions that may occur at mobile computing device 200 can be communicated to accessory 202. Conversely, messages relating to user input events, detected external conditions, received data or other events or conditions that may occur at accessory 202 can be communicated to mobile computing device 200.

For example, in some embodiments, mobile computing device 200 can process input events from a user, for example, through user interface 255, such as touch screen events, button presses, scroll wheel events, etc. Mobile computing device 200 can provide data representative of input events to an application running on mobile computing device 200, to accessory 202, or to both. Accessory 202 can interpret such data as input for controlling, for example, accessory specific hardware 275 and/or for processing at controller 260. For example, touch screen data can be collected by mobile computing device 200 for use by an application, accessory 202, or both; in some embodiments, touch screen data can include data representing taps and/or movements such as swipes, pinches, drags, and other gestures. In some embodiments, touch screen data can be sent in raw data format (e.g., a sequence of coordinates representing where pressure corresponding to a finger movement was detected). In other embodiments, touch screen data can be converted into processed data, such as gesture events (e.g., a tap, a swipe or drag from one point to another, a pinch, etc.) prior to being sent to an accessory. In some embodiments, raw keyboard data can be sent to an accessory and/or processed keyboard data can be sent to an accessory. In some embodiments, some or all types of user input data can be communicated to accessory 202 using an application and application protocol, e.g., as described below; in other embodiments, some or all types of user input data can be communicated using the accessory communication protocol to whatever extent the accessory communication protocol supports sending user input data of a particular type.

Mobile computing device 200 can also send information other than user input to accessory 202. For example, in some embodiments, mobile computing device 200 can include various sensors and/or data gathering devices in addition to user input devices; examples can include an accelerometer, gyroscope, compass, location-determining device (e.g., a Global Positioning System receiver or telephonic triangulation system), light sensor, infrared sensor, camera, network interface (e.g., telephone, WiFi, Bluetooth), or the like. Mobile computing device 200 can provide any or all of this data to accessory 202, e.g., in response to a specific request from accessory 202. In some embodiments, some or all of this data can be communicated to accessory 202 using an application and application protocol, e.g., as described below; in other embodiments, some or all of this data can be communicated using the accessory communication protocol to whatever extent the accessory communication protocol supports sending information of a particular type.

In another example accessory 202 can receive input events from mobile computing device 200. Such events can correspond to user input and/or other data detected at mobile computing device 200, including but not limited to any of the data types described above. In some embodiments, such input events can be processed by controller 260 at accessory 202 to control accessory specific hardware 275. For example, touch screen or other user input events at mobile computing device 200 can be sent to accessory 202 to turn on, change the state of, receive data from, provide data to, turn off, and/or set settings for, accessory specific hardware 275. Touch screen data, for example, can be sent in raw data format or as interpreted events (e.g., press, swipe, pinch). In some embodiments, accessory specific software 280 can include instructions to receive and/or interpret raw touch screen data. In some embodiments, accessory specific software 280 can include instructions to translate raw touch screen data into commands and/or controls for accessory specific hardware 275. In another embodiment, the touch screen data can be provided in raw format to an application executing on mobile computing device 200, which can interpret the data and send corresponding commands and/or information to accessory 202.

Moreover, input events received at accessory 202 from mobile computing device 200 can be processed by controller 260 executing accessory specific software 280. In some embodiments, accessory specific software 280 can interact with accessory specific hardware 275 in response to input events received from mobile computing device 200.

Further, in some embodiments, accessory specific hardware 275 can also be controlled by mobile computing device 200 via a connection with accessory 202. For example, an application executing on mobile computing device 200 can include program code that, when executed by processor 230, can control, interface with, interoperate with, and/or receive signals from the accessory specific hardware 275 at accessory 202. In some embodiments, the application executing on mobile computing device 200 can exchange messages with a control program executing on controller 260 of accessory 202, thereby instructing controller 260 to communicate with and/or control operation of accessory specific hardware 275. Such messages can be exchanged using an application protocol, e.g., as described below.

In some embodiments, accessory specific hardware 275 can provide input data to controller 260. For example, accessory specific hardware 275 can include a measurement sensor that can convert physical characteristics into data (or electronic signals representing data; the terms are used interchangeably) that can be sent to controller 260 and/or stored in memory 265. Controller 260 can then process the data (e.g., applying calibration corrections, reducing noise, and/or other data-processing operations). The processed data can be sent from accessory 202 to mobile computing device 200. At mobile computing device 200 an application can further process the data and/or provide the data to a user through the user interface. Moreover, the application can perform any number of functions in response to the data.

In some embodiments, an accessory and an application can exchange any messages desired, where the term "message" refers generally to any type of control signal, event, data, status or configuration information or any other type of information available to the sender. To facilitate exchange of messages, an accessory and an application can use a mutually agreed-upon application protocol. The application protocol can specify a universe of accepted formats for messages that can be exchanged. Devices or programs adhering to a particular application protocol can structure the messages they send in accordance with the application protocol's universe of accepted formats and can interpret messages they receive in accordance with the application protocol's universe of accepted formats. For instance, in the case of binary digital communication, the application protocol can specify how the bits comprising the message are to be interpreted by the recipient. Thus, like the accessory communication protocol, an application protocol can specify packet structures; commands; lingoes; payload formats; and/or other formats, data structures, semantics or rules of interpretation such that a particular message sent by one participant will be correctly interpreted by the recipient. Indeed, in some embodiments, portions of the accessory communication protocol can be directly adopted as all or part of an application protocol for a particular accessory and/or application.

In certain embodiments described herein, application protocol messages can be sent between devices by encapsulating, wrapping, or packaging the messages within packets conforming to the accessory communication protocol, e.g., using tunneling commands as described above. Thus, the transport link specified by the accessory communication protocol can be used, and it is not necessary for an application protocol to specify a physical transport link.

It is contemplated that an unlimited range of accessories and applications that use a variety of different application protocols can be created for use with a particular mobile computing device (or line of mobile computing devices). In some embodiments, mobile computing device 200 can be configured with application protocol management capability (e.g., using an application manager) that includes tracking the application protocol(s) used by each connected accessory and the application protocol(s) used by each executing and/or installed application. For example, mobile computing device 200 can provide system services to facilitate identifying an appropriate application to be used with a particular accessory and/or identifying whether a suitable accessory is available for a particular application. These services can be provided without requiring the system services of mobile computing device 200 to implement or communicate according to any application protocol.

FIG. 3 shows an example of an active/inactive lookup table. Lookup table 310 can be maintained by the mobile computing device and can include the port identifier that identifies ports with which an accessory is coupled. In some embodiments, all or a portion of the lookup table can be maintained by one or more accessories. In some embodiments, all or a portion of the lookup table can be stored at a network location and accessed through a network. Lookup table 310 can also include the activity status of the accessory. That is, whether the accessory is active or inactive. The table can also include information about when the accessory was connected. Moreover, lookup table 310 can be stored in memory at the mobile computing device (e.g., storage device 225).

FIG. 4 shows an example of a video capability lookup table for one or more connected accessories. Lookup table 410 can be maintained by the mobile computing device and can include video capability information received from one or more accessories. In some embodiments, the mobile computing device can request video capability information to populate lookup table 410. Lookup table 410 can include any or all of the following about the accessory: port identifier, activity/inactivity status, video resolution of the accessory, coding, aspect ratio, screen size, format, rank, and/or connection time. The rank can be determined based on any number of factors and can be weighted to favor some factors over others. For example, accessories that can play video in the high definition format can be ranked above accessories that cannot. Similarly, accessories with a larger screen size can receive a higher rank. Thus, an accessory that can play video in high definition and with the largest screen can be ranked the highest. Various ranking schemes can be used. Such ranking schemes can be dynamic, that is, the schemes can change depending on various factors such as the media type, user input, user preferences, applications executing on the mobile computing device, available power, etc. Moreover, lookup table 410 can be stored in memory at the mobile computing device (e.g., storage device 225).

Figure 5:
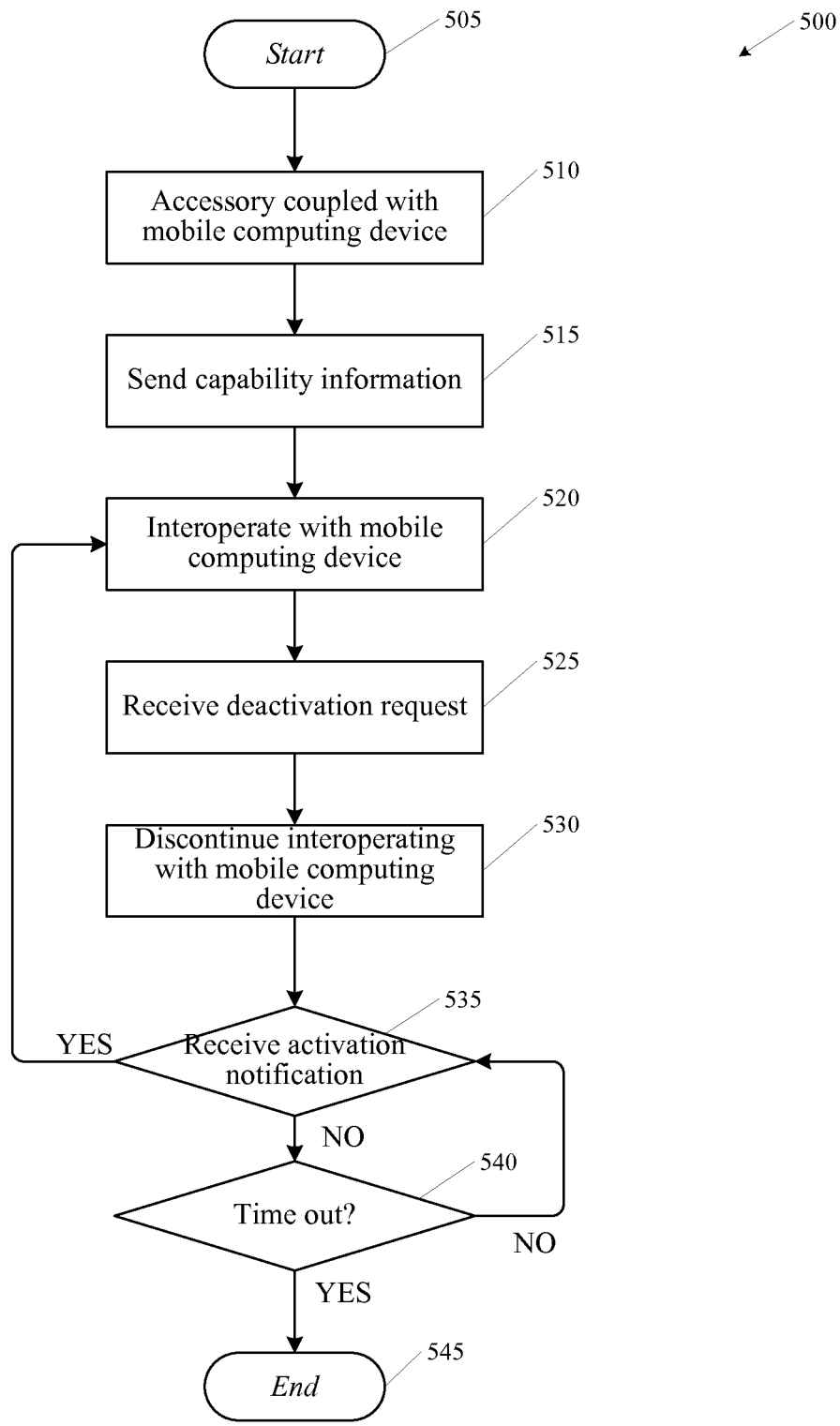
FIG. 5 shows a flowchart of a process occurring at an accessory in response to a deactivation request from a mobile computing device according to one embodiment of the invention.

Embodiments of the invention extend to both mobile computing devices, accessories, and/or the combination of accessories with mobile computing devices. FIG. 5 shows a flowchart of process 500 that can occur at an accessory in response to a deactivation request from a mobile computing device according to one embodiment of the invention. Process 500 starts at block 505. At block 510 the accessory becomes connected with a mobile computing device. In some embodiments, the accessory can be connected either wirelessly or through a wired connection. Connectivity can be determined by sensing power through the connector, receiving a message, or after wireless handshaking has occurred.

At block 515 the accessory can communicate accessory capability information to the mobile computing device. This accessory capability information can be used by the mobile computing device to, among other things, determine which if any accessories should be deactivated at any given time. Accessory capability information can be stored in a lookup table at the mobile computing device (e.g., accessory 410 of FIG. 4). At block 520 the accessory and the mobile computing device can interoperate. This can include sending and/or receiving messages and/or commands to and from the mobile computing device such as authentication related data.

At block 525 a deactivation request can be sent from the mobile computing device to the accessory. The deactivation request can be triggered by the mobile computing device in response to any number of events. In response to the deactivation request the accessory can discontinue interoperating with the mobile computing device at block 530. The accessory can then wait for an activation notification from the mobile computing device at block 535. If such a notification is received, then process 500 can return to block 520. After a period of time process 500 can time out at block 540 and process 500 can end at block 545. In some embodiments, if the time out period has not been reached at block 540, process 500 can cycle through blocks 535 and 540 until an activation notification is received or the time out period is reached. In some embodiments, the deactivation request can be a message with a command to cease communication with the mobile computing device. In other embodiments, the deactivation request may not be sent directly to the accessory. For example, the mobile computing device can toggle or turn off the power between the mobile computing device and the accessory. When the accessory restarts the mobile computing device can decline a request for connectivity.

In some embodiments, the accessory can request reactivation after a predetermined period of time. For example, the accessory can send a message to the mobile computing device to request activation of the accessory. The mobile computing device can ignore the request or determine whether the condition that prompted the accessory deactivation is still warranted and may or may not reactivate the accessory. In some embodiments, the mobile computing device can toggle the accessory's power and accept a request for connectivity.

At block 515 the capabilities information can include any parameter that can define the accessory's capabilities. In some embodiments, capability information can be provided in response to a request from the mobile computing device. In some embodiments, the capability information can be sent in a message that includes a bitmask where the state of each bit can indicate whether a specific capability is supported or not supported. These capabilities can include, for example, whether the accessory supports analog line-in, analog line-out, analog video-in, analog video-out, digital audio out, digital audio in, digital video in, digital video out, speakerphone, communication with mobile computing device operating system application, video resolution, video aspect ratio, video encoding, video screen size, resolution, compatible video playback formats, etc.

Figure 6:
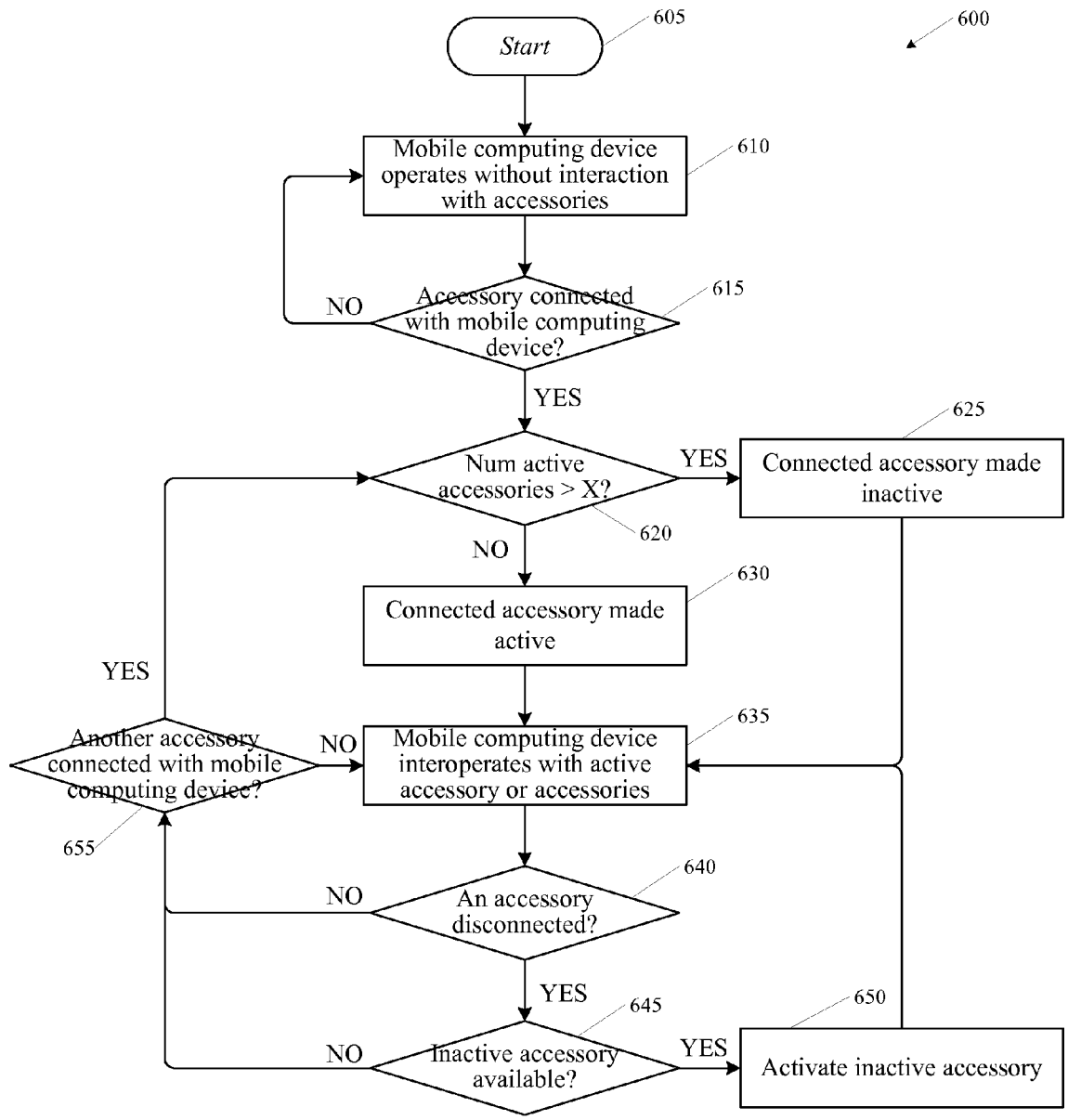
FIG. 6 is a flowchart of a process for managing active and inactive accessories according to one embodiment of the invention.

FIG. 6 shows a flowchart of process 600 which can be used by a mobile computing device (e.g., mobile computing device 22 of FIG. 1 or mobile computing device 200 of FIG. 2) to manage active and inactive accessories according to some embodiments of the invention. Process 600 starts at block 605. At block 610 the mobile computing device operates initially without interaction with any connected accessories. At block 615, process 600 determines if an accessory is connected with the mobile computing device. If an accessory is connected, then process 600 moves on to block 620; otherwise process 600 returns to block 610. Prior to block 620 the accessory and/or mobile computing device can exchange capability information and/or undergo authentication.

At block 620, the mobile computing device determines whether the number of active accessories connected with the mobile computing device is greater than a threshold value, denoted in the figure as X. This threshold value can be any integer, can vary over time, can depend on which applications is/are running on the mobile computing device, and/or can depend on the types of accessories, etc. This comparison can be done, for example, by referencing an active/inactive accessory lookup table (e.g. table 310 in FIG. 3) that lists the activity status of connected accessories. Moreover, threshold value, X, can be resource specific. For example, the mobile computing device's memory resource may have an accessory threshold lower than the processor resource. Other resources, such as, communication bandwidth, application resources, database resources, etc. can also have different thresholds. In some embodiments, the lowest of the resource thresholds can be used at block 620. In some embodiments, an accessory can be deactivated based on any of the resource thresholds. And in other embodiments, an accessory resource can be deactivated based on any of the resource thresholds while other accessory resources are not deactivated.

If the number of active accessories is greater than the threshold value, as determined at block 620, then process 600 moves onto block 625. At block 625 the most recently connected accessory can be deactivated. On the other hand, if the number of active accessories is less than the threshold value, as determined at block 620, then process 600 moves to block 630. At block 635 the mobile computing device can interoperate with the active accessory or accessories. Thus, accessories can be made active based on the order in which the accessories are connected with the mobile computing device or the order they are recognized as being connected with the mobile computing device. In some embodiments, an indication can be made in an active/inactive accessory lookup table that the recently connected accessory is either active or inactive as determined above. In some embodiments, the first accessory connected can be activated. In other embodiments, the last accessory connected can be activated. Various other combinations of accessories can be activated. Deactivation can occur in a number of ways. For example, a deactivation command can be sent or power to the accessory can be cut off. In wireless communications, for example, a deactivation command may be required.

At block 640, if an accessory is disconnected then process 600 determines whether any inactive accessories are available at block 645, and the inactive accessory can be activated at block 650. For example, this determination can be made by reference to the active/inactive accessory lookup table. Also, the recently disconnected accessory, for example, can be removed from the active/inactive lookup table or referenced as disconnected within the active/inactive accessory lookup table. In some embodiments, in the event that multiple inactive accessories are connected with the mobile computing device, then the inactive accessory that was connected with the mobile computing device first, by default, can be activated. In other embodiments, the user can be asked to select the accessory which should be activated. In yet other embodiments, the most recent accessory connected can be activated. And in yet other embodiments the mobile computing device can activate an accessory that makes the best use of the mobile computing device resources. These resources can include, for example, application compatibility, application availability, connectivity bandwidth, processing bandwidth, memory availability, database availability and/or access, etc.

If an accessory is not disconnected or no inactive accessories are available, then process 600 can proceed to block 655. If another accessory is connected to the mobile computing device then process 600 returns to block 620, otherwise the process returns to block 635.

Figure 7:
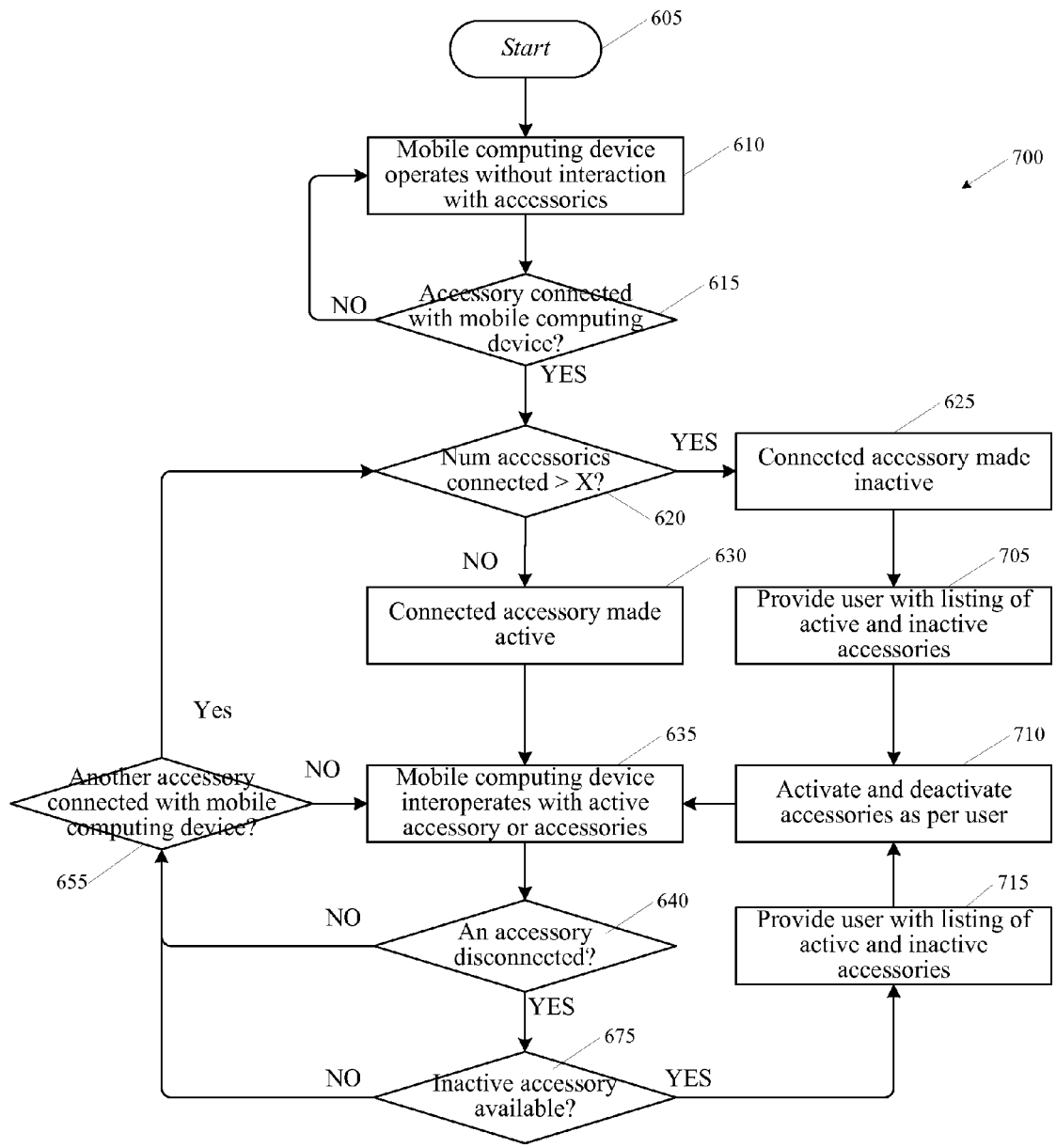
FIG. 7 is a flowchart of a process for managing active and inactive accessories according to one embodiment of the invention.

Various other embodiments can be used to decide which accessory or accessories can be active or inactive. One such embodiment is shown in FIG. 7. Process 700 is similar to process 600 except that after a connected accessory is made inactive, the user can be prompted to decide which accessory or accessories, if any, to activate at block 705. The prompting can include listing the active and/or inactive accessories and allowing the user to select from this listing. The user can be prompted, for example, through a user interface at the mobile computing device or through a user interface at any of the accessories. A selection can also be provided that allows the user to deactivate all the accessories connected with the mobile computing device. If this is done through an accessory, the mobile computing device can send a listing of the available accessories, for example, using an AvailableAccessory command that can specify accessory names and/or identifiers to the accessory. In response to the user input, the accessory can send ActivateAccessory command to the mobile computing device indicating the active and/or inactive accessories as selected by the user. Following the user's selection, at block 710 the accessories are activated and/or inactivated as specified by the user, after which process 700 proceeds to block 635. Also, following block 645, if an accessory is disconnected and inactive accessories are connected, the user can be provided with the option to activate or inactivate accessories at block 715. If the number of inactive accessories connected with the mobile computing device is equal to or less than the number of available active accessory slots then there is no need to request user input regarding which accessories to activate and deactivate.

In some embodiments, when an active accessory is deactivated or disconnected and a number of inactive accessories are available, then the mobile computing device can activate one of the inactive accessories based on the type of accessory that was just disconnected or deactivated. For example, if an accessory providing audio output is disconnected while being used and another audio output enabled accessory is inactive and available, then this audio enabled accessory can have priority over other inactive accessories and, for example, can be automatically activated.

In some embodiments, an accessory status accessory lookup table can include information such as any of the following: accessory name, accessory ID, port on which accessory is connected, accessory capabilities (e.g., supports audio input/output, supports video input/output, etc.), compatible applications, status (active or inactive), priority (when the accessory was connected relative to other accessories), etc. In some embodiments, an accessory status lookup table can be maintained by the mobile computing device. The status lookup table can include state information for inactive accessories. When an inactive accessory is activated, the mobile computing device can restore the accessory to its previous state and/or continue with the accessory interaction where the mobile computing device left off. In other embodiments, the mobile computing device can delete all pending commands or requests from the accessory.

The threshold value used at block 620 can be a dynamic or static value. For example, execution of processing-heavy applications at the mobile computing device may decrease the device's ability to interact with more accessories. In such scenarios, the mobile computing device can dynamically decrease the threshold value to compensate for such heavy processing. If, however, applications are executing on the mobile computing device that are processing-light, then the mobile computing device can dynamically increase the threshold value. As another example, if an accessory is using a lot of bandwidth, then the mobile computing device can decrease the threshold value. And the mobile computing device can increase the threshold value when bandwidth availability increases.

Moreover, the threshold value can depend on the application or applications executing on the mobile computing device. For instance, some applications may interact with a single accessory at a given time. In such embodiments, the threshold value can be one. And any accessories connected with the mobile computing device besides a single accessory can be deactivated.

In some embodiments, an accessory can communicate with the mobile computing device using a specific set of commands. Such commands can be limited for interaction between a single accessory and an application executing on the mobile computing device. In some embodiments, the mobile computing device can deactivate all accessories requesting use of the same specific set of commands when another accessory is currently using the specific set of commands.

In some embodiments, some applications executing on a mobile computing device limit specific interactions to a single accessory. For example, an application can limit audio streaming to a single accessory connected at a single port. If other audio output accessories are connected with the mobile computing device, then the mobile computing device can inactivate any other accessories and allow audio output only with the single accessory. For example, if two speaker accessories (e.g., headphones) are connected with a mobile computing device, the mobile computing device can stream audio to a single speaker accessory and deactivate the other speaker. In some embodiments, the mobile computing device or an application executing on the mobile computing device can deactivate speaker(s) that provide the lowest quality audio output. Or the mobile computing device can activate the speakers with the highest quality and deactivate all other speakers. This can be done by querying the speakers regarding their audio quality capabilities, by reference to a lookup table stored in memory at the mobile computing device, and/or by reference to a network location. In other embodiments, the mobile computing device can allow the user to choose which speakers should be active and which speakers should be inactive.

In some embodiments, applications executing on the mobile computing device can similarly limit video streaming to a single accessory at a single port. If other accessories are connected with the mobile computing device that can receive and play video, then these accessories can be deactivated. Depending on the accessory, a video stream can include a number of different format settings, such as aspect ratio, video encoding (e.g., PAL, NTSC, SECAM), resolution, screen size, format (e.g., whether it plays high definition video), etc. Thus, if multiple accessories are connected with the mobile computing device and have different format settings, then the video output can be compromised at one or more of the accessories. By deactivating accessories that are not compatible with the video format of the video stream, such conflicts can be eliminated. In some embodiments, the mobile computing device or an application executing on the mobile computing device can deactivate accessory displays that provide the lowest quality video output. Or the mobile computing device can activate displays with the highest video quality and deactivate all other displays. This can be done by querying the displays regarding their video quality, by reference to a lookup table stored in memory at the mobile computing device, and/or by reference to a network location.

In other embodiments, the mobile computing device can query the user and allow the user to choose which display should be active and which display(s) should be inactive. In yet other embodiments, the mobile computing device can deactivate all displays except one and allow the user to choose which if any should be the active display.

In some embodiments, the user can be queried to decide the active or inactive status of an accessory when a new accessory is connected with the mobile computing device. Such embodiments can allow the user to have complete or partial control of every accessory's active or inactive status. In some embodiments, the appropriate entries can be made in an active/inactive accessory table.

In some embodiments, accessories can be deactivated in response to external conditions. In some embodiments, when the mobile computing device enters a stand by mode all accessories can be deactivated. In some embodiments, when the mobile computing device enters airplane mode all wireless accessories can be deactivated, for example, by sending a deactivation command to the accessory prior to or in conjunction with deactivating the mobile computing device's antennas. In some embodiments, accessories can be deactivated when the available battery power is below a threshold value, such as 1%, 5% or 10%. In some embodiments, the user can be prompted to choose whether to deactivate accessories when any of the proceeding or similar conditions occur.

Figure 8:
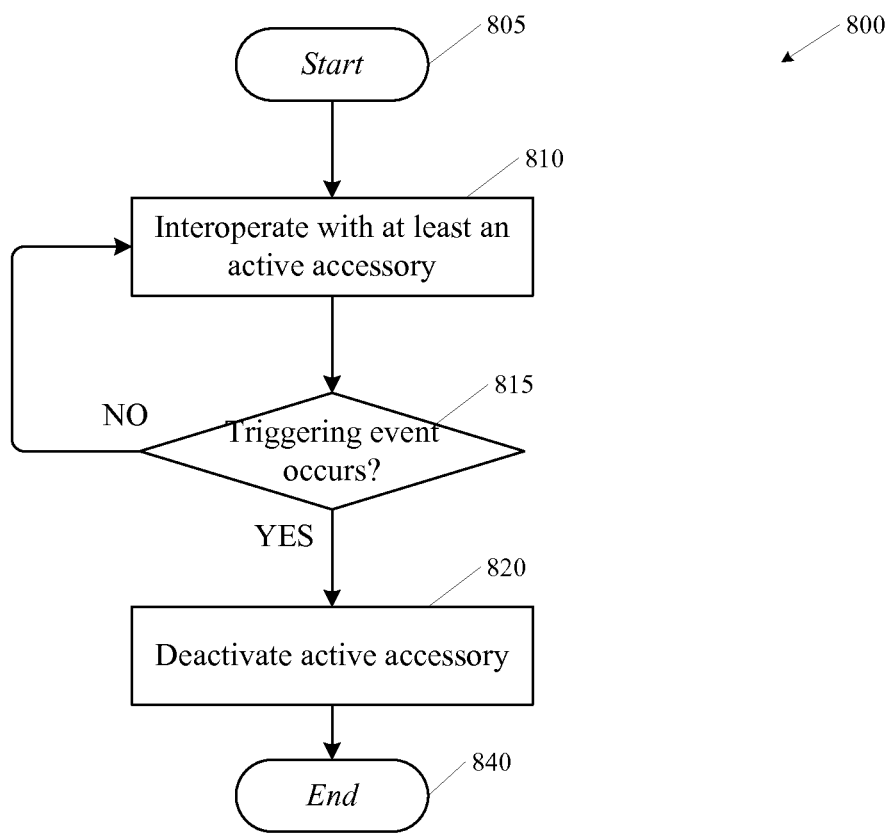
FIG. 8 is a flowchart of a process for managing active and inactive accessories according to one embodiment of the invention.

FIG. 8 shows a flowchart of process 800 for deactivating an accessory in response to a triggering event. Process 800 can start at block 805. At block 810 the mobile computing device can interoperate with one or more active accessories. At block 815 a triggering event can occur. In response to the triggering event, at least one active accessory can be deactivated at block 820. Process 800 can end at block 840.

In some embodiments, the triggering event can be accessory related. For example, the triggering event can include an improper accessory command or request. The accessory, for example, may send an unsupported command that triggers the deactivation of the accessory. As another example, the accessory may send a command, request or message that causes processing or other errors in the mobile computing device. Various other accessory related triggering events can occur. As yet another example, the triggering event can also include a request from the user to deactivate an accessory. The triggering event, for example, can be prompted by the accessory becoming inoperable.

In some embodiments, the triggering event can also include an activation request for an inactive accessory. This request may allow the mobile computing device to reconsider the inactive status of the requesting accessory. In some embodiments, the mobile computing device can reevaluate the inactive state of the accessory and either keep the accessory in the inactive state or cause the accessory to become active. In some embodiments, this decision may require user input. In some embodiments, this decision can be made by determining whether any of the mobile computing device resources become available and/or support another active accessory.

In some embodiments, the triggering event can include starting or receiving a telephone call or playing media on the mobile computing device. In these embodiments, various accessories that may conflict with a telephone call or playing media can be disconnected.

Figure 9:
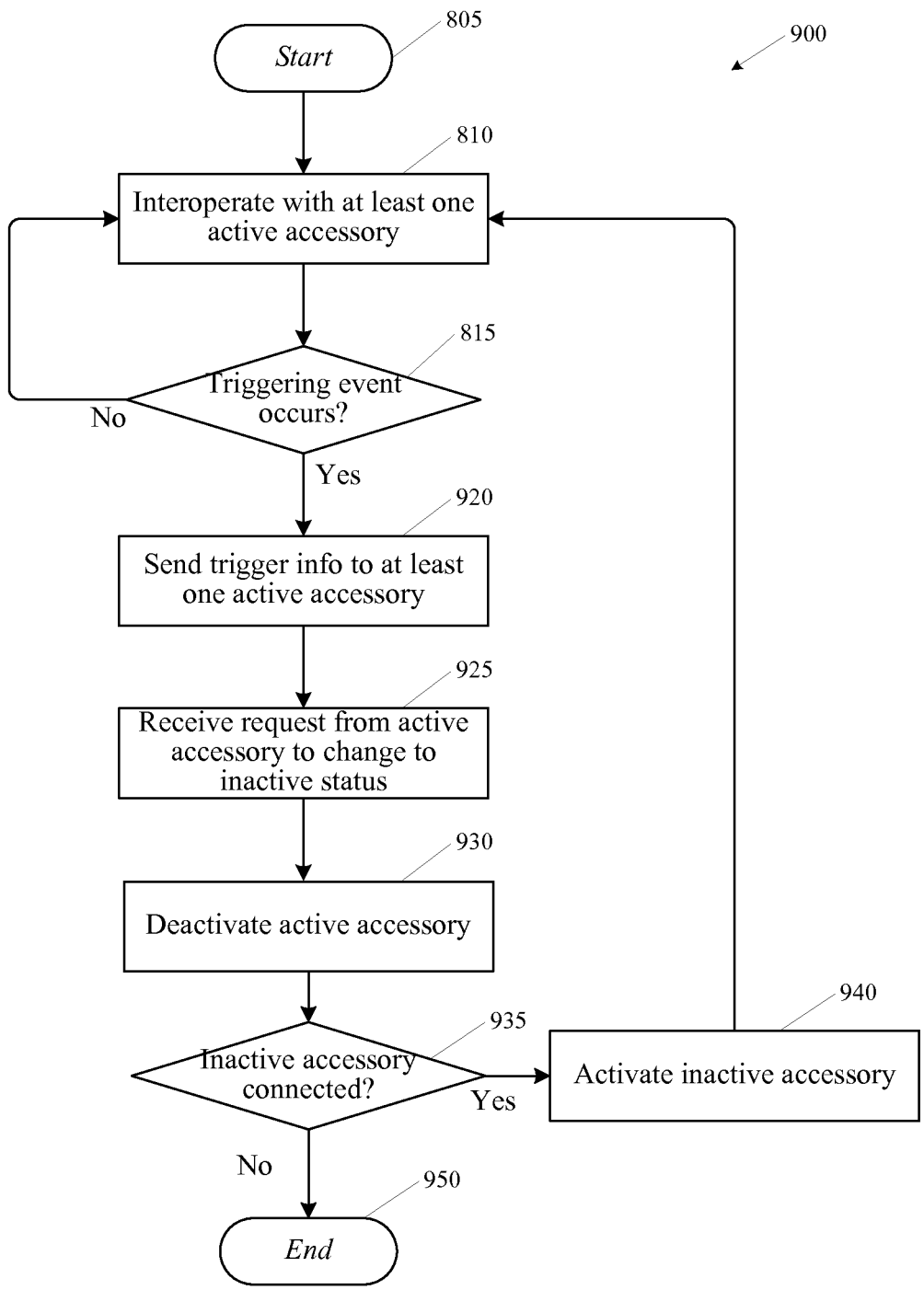
FIG. 9 is a flowchart of a process for managing active and inactive accessories according to one embodiment of the invention.

FIG. 9 shows a flowchart of process 900 where a trigger event can prompt an accessory to request deactivation in lieu of another inactive accessory according to one embodiment of the invention. Process 900 can start at block 805. At block 810 the mobile computing device can interoperate with one or more active accessories. At block 815 a triggering event can occur. In response to the triggering event, trigger information can be sent to an active accessory at block 920. In some embodiments, this trigger information may not be sent to an active accessory. Instead, the triggering event can be detected or initiated by the active accessory. At block 925 a request to deactivate an accessory can be received, and the active accessory can be deactivated at block 930. If a deactivated accessory is connected with a mobile computing device as determined at block 935, then the deactivated accessory can be activated in response to the triggering event at block 940 and process 900 can return to block 810. If multiple inactive accessories are connected, the mobile computing device can select which one to activate or allow the user to make the selection. Otherwise, process 900 can end at block 950. In some embodiments, the active accessory and the inactive accessory can be in communication with one another or can have a mutual agreement between the accessories that active status be transferred to an inactive accessory based on some triggering event. In some embodiments, user input can be requested to determine if the user would like inactive and activate accessories.

In some embodiments, when the mobile computing device deactivates an accessory, internally the mobile computing device can discard all or some commands from the accessory and free up any resources the accessory was using. In other embodiments, the mobile computing device can store any unprocessed commands from the accessory that were sent prior to deactivation and/or the state of the accessory. This information can be saved, for example, in an accessory status lookup table. In the event the accessory is reactivated, then the accessory commands and/or state can be reinstated.

In some embodiments, when an accessory is in an inactive state and has been notified that the accessory is inactive, the accessory should not attempt to communicate with the mobile computing device. In some embodiments, however, the accessory can request that the mobile computing device reevaluate the active/inactive state, until the mobile computing device causes the accessory to exit the inactive state. The accessory, for example, can send a RequestActiveStatus command, which can initiate the reevaluation processes. In some embodiments, rather than send the RequestActiveStatus command, the accessory can toggle the state of the accessory such that the mobile computing device treats the accessory like a new accessory and reevaluates the active/inactive status.

In some embodiments, the mobile computing device can notify the accessory of the inactive state by sending a SendDeactivation command to the accessory. In some embodiments, this can be particularly useful when the accessory is connected with a wireless connection. In response, the accessory can restrict all communication to the mobile computing device. In some embodiments, the mobile computing device can also turn off power to a wired accessory when the accessory is deactivated. In some embodiments, the accessory can shut down, sleep or disconnect itself from the mobile computing device.

In yet other embodiments, the accessory may request to become inactive by sending a command to the mobile computing device requesting that the accessory be made inactive. For example, a RequestInactiveStatus command can be used by the accessory to make the inactivity request. In other embodiments, the accessory can electrically appear as detached. For example, if the accessory is connected using a connector (e.g., a 30 pin connector) that has contacts used for accessory identification (e.g., accessory detect and/or resistor ID lines), the accessory can float these pins.

Figure 10:
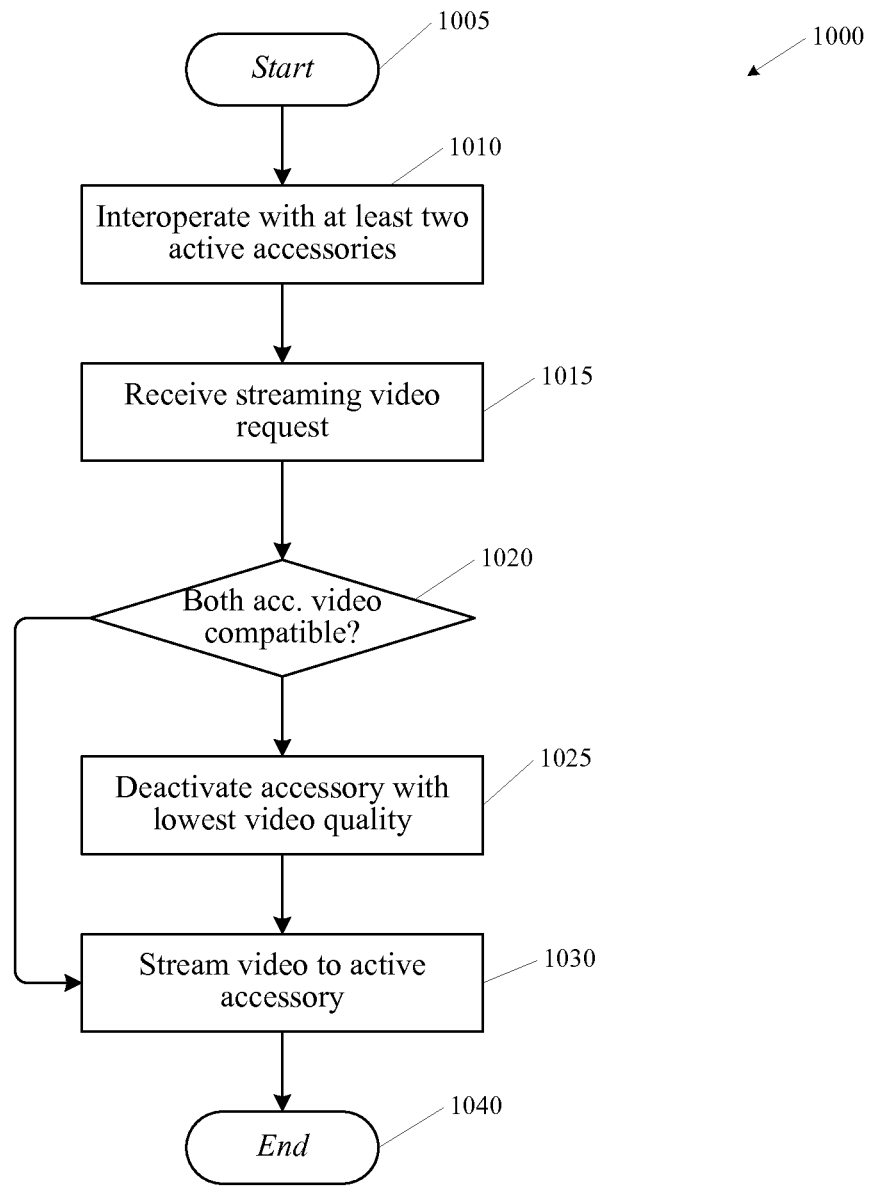
FIG. 10 shows a flowchart of a process that can be used by a mobile computing device to deactivate accessories that are not compatible with a video streaming format according to some embodiments of the invention.

FIG. 10 shows a flowchart of process 1000 that can be used by a mobile computing device to deactivate accessories that do not provide the highest video format according to some embodiments of the invention. Process 1000 can start at block 1005. At block 1010 the mobile computing device can interoperate (e.g., be connected with) two or more accessory devices. In some embodiments, at least two of these accessory devices can have video playback capabilities. At block 1015 the mobile computing device can receive a request to stream video. The request, for example, can come from a user through a user interface at the mobile computing device or through one of the accessories. At block 1020 it can be determined whether more than one accessory can provide video playback capabilities. If one of the accessories does not support video playback, process 1000 proceeds to block 1030 and video is streamed to the active accessories.

If both accessories support video playback, as determined at block 1020, then at block 1025, the accessory (or accessories) with the lowest playback quality is (are) deactivated. This can be determined in any number of ways. For example, a lookup table (e.g., lookup table 410 in FIG. 4) can be maintained at the mobile computing device that stores and ranks the video quality of each accessory. In some embodiments, the lookup table can include any or all of the following: port, active/inactive status, format settings such as aspect ratio, video encoding (e.g., PAL, NTSC, SECAM), resolution, screen size, format (e.g., whether it plays high definition video), time of connection, quality rank, etc. The mobile computing device (or an accessory) can rank the accessories based on any combination of these factors and deactivate the accessory with the least favorable playback quality rank at block 1020. In some embodiments, playback quality factors can be weighted or modified by the user to ensure that factors important to the user are taken into account. Moreover, the media may require playback using a specific type of feature. For example, the media may require a specific aspect ratio for playback. The ranking may then be skewed or weighted toward this specific aspect ratio. At block 1030 the video can be streamed to the active accessory. Process 1000 can end at block 1040.

In some embodiments, if both accessories have the same playback quality rank, then the accessory that has been connected the longest or shortest can be selected by default. Or the mobile computing device can stream video to both accessories simultaneously. In some embodiments, the user can trump the determination made at block 1025 and force streaming to the other accessory.

In some embodiments, of the invention, the mobile computing device can deactivate an accessory by toggling the accessory power. In response the accessory can re-try connecting to the mobile computing device at set periods of time. In some embodiments, the mobile computing device can decline to establish communication with the accessory. In other embodiments, the mobile computing device can send a command to the accessory to cause the accessory to re-try connecting to the mobile computing device. In yet another embodiment, the mobile computing device can send a notification command to the accessory to tell it that it is now active again and that the accessory can communicate with the mobile computing device.

In some embodiments, the accessory can request that the mobile computing device re-evaluate the inactive state of the accessory. This can be done, for example, by causing some specific electrical signals to be toggled (e.g. toggling an accessory detection signal line from low to high and then back down to low). As another example, the accessory can send a command to the mobile computing device to re-evaluate the inactive state of the accessory and/or cause one of the actions for exiting the inactive state to be performed.

In some embodiments, the accessory can request that the mobile computing device re-evaluate the inactive state of the accessory due to a change in some state or situation that affects resource requirements or requires that the mobile computing device (and/or the user) needs to be notified of the change in resource requirements. For example, the reevaluation can occur when another device is attached or detached from the accessory itself. This can change the resource requirements such that the accessory can request that the mobile computing device re-evaluate the inactive state of the accessory. This could also change where media can be output. This can be done, for example, with a dock accessory that can support accessory daisy chaining and can have another accessory or accessories attached/detached to its virtual port.

In some embodiments, the triggering event referred to at block 815 in FIG. 8 and FIG. 9 can include an action that occurs at an inactive accessory. In response, the inactive accessory can request a change in the active/inactive status and indicate that the user wants to use the accessory as indicated by their use of the accessory.

In some embodiments, accessories can communicate with one another either wirelessly or through a physical connection. If one accessory is active and the other inactive, the accessories can mutually agree to transfer active status from one accessory to the other. To do so, for example, the active accessory can send a command to the mobile computing device to transfer active status to the other accessory.

In some embodiments, a mobile computing device can do nothing in response to an active accessory becoming disconnected or inactive despite having inactive accessories connected thereto. The mobile computing device can wait for an accessory to request activation or for the user to request activation.

In some embodiments, an accessory can be partially deactivated. Partial deactivation can preclude the accessory from using one or more resources or features of the mobile computing device. For example, an accessory can be capable of both accessing a multimedia database of the mobile computing device and displaying video from the mobile computing device. If access to the multimedia database is unavailable (e.g., if the threshold number of accessories granted access to the database has been reached or if the database is currently being used by an application executing at the mobile computing device) then the mobile computing device can deactivate access to the multimedia database yet still provide video to the accessory for display. Alternatively, if another video playback device is available with better video display capabilities then the display function of the accessory can be deactivated. Thus, each resource or feature of the mobile computing device can have a threshold (e.g., value "X" in block 620 of FIG. 6). When the number of accessories using that resource or feature exceeds the threshold value, then that feature or resource can be deactivated in the mobile computing device's interaction with the accessory.

Embodiments of the present invention can be realized using any combination of dedicated components and/or programmable processors and/or other programmable devices. The various processes described herein can be implemented on the same processor or different processors in any combination. Accordingly, where components are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter-process communication, and different pairs of processes may use different techniques, or the same pair of processes may use different techniques at different times. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable media encoded with the program code may be packaged with a compatible electronic device, or the program code may be provided separately from electronic devices (e.g., via Internet download).

Thus, although the invention has been described with respect to specific embodiments, the invention is intended to cover all modifications and equivalents within the scope of the following claims.

What is claimed is:

1. A method for managing accessories connected with a mobile computing device, wherein the mobile computing device is coupled with a first accessory, a second accessory, and a third accessory, the method comprising:
   interacting, by the mobile computing device, with the first accessory and the second accessory, wherein the third accessory is in an deactivated state, the mobile computing device, the first accessory, the second accessory, and the third accessory being separately-housed electronic devices, wherein interacting with the first accessory includes one or both of sending a command to the first accessory to invoke a function of the first accessory or receiving a command from the first accessory to invoke a function of the mobile device; receiving, by the mobile computing device, an indication that a triggering event has occurred;
   in response to the triggering event, receiving, by the mobile computing device, a request from the first accessory to deactivate the first accessory;
   in response to the request from the first accessory to deactivate the first accessory, deactivating, by the mobile computing device, the first accessory;
   determining, by the mobile computing device, that a number of allowed active connections has not exceeded a threshold number of active connections;
   activating, by the mobile computing device, the third accessory based on the determination;
   interacting, by the mobile computing device, with the second accessory and the third accessory while the first accessory is inactive;
   receiving, by the mobile computing device, an activation request from the first accessory, wherein the activation request from the first accessory is prompted by a user interaction with the first accessory; and
   reevaluating, by the mobile computing device, the inactive state of the first accessory based on the activation request from the first accessory.

2. The method according to claim 1, wherein the second accessory was connected with the mobile computing device prior to the first accessory.

3. The method according to claim 1, wherein the triggering event is received from either or both the first accessory or the second accessory.

4. The method according to claim 1, wherein the triggering event is received from a user through a user interface.

5. The method according to claim 1,
   wherein the triggering event comprises a media playback event.

6. The method of claim 1 wherein deactivating the first accessory comprises terminating power to the first accessory.

7. The method of claim 1 wherein the activation request from the first accessory is prompted by the attachment of a separately-housed electronic device to the first accessory.

8. The method of claim 1 wherein the activation request from the first accessory is prompted by the detachment of a separately-housed electronic device from the first accessory.

9. The method of claim 1, wherein receiving the activation request from the first accessory comprises detecting a toggling of an accessory detect line from the first accessory.

10. The method of claim 1, wherein receiving the activation request from the first accessory comprises receiving a command from the first accessory.

11. The method of claim 1 further comprising agreeing, by the first accessory and the second accessory, to transfer active status from the second accessory to the first accessory.

12. The method of claim 11 further comprising receiving, by the mobile computing device, a command from the second accessory to transfer the active status to the first accessory.

13. A mobile computing device comprising:
   a processor;
   a memory coupled to the processor; and
   a communication interface coupled to the processor, wherein the processor in conjunction with the communication interface:
   determines that a first accessory, a second accessory, and a third accessory are coupled to the mobile computing device, wherein the first and the second accessories are in an active state and the third accessory is in an inactive state, the mobile computing device, the first accessory, the second accessory, and the third accessory being separately-housed electronic devices, wherein interacting with the first accessory includes one or both of sending a command to the first accessory to invoke a function of the first accessory or receiving a command from the first accessory to invoke a function of the mobile device;

interacts with the first accessory and the second accessory;

receives an indication that a triggering event has occurred;

in response to the triggering event, receives a request from the first accessory to deactivate the first accessory;

in response to receiving a request from the first accessory to deactivate the first accessory, deactivates the first accessory and activate the third accessory;

interacts with the second accessory and the third accessory while the first accessory is deactivated;

receives an activation request from the first accessory, wherein the activation request from the first accessory is prompted by a user interaction with the first accessory; and reevaluates the inactive state of the first accessory based on receiving the activation request from the first accessory.

14. The mobile computing device of claim 13 wherein the second accessory is connected to the mobile computing device prior to the first accessory being connected to the mobile computing device.

15. The mobile computing device of claim 13 wherein the triggering event is received from a user operating the mobile computing device.

16. The mobile computing device of claim 13 wherein the triggering event is received from the first accessory or the second accessory.

17. The mobile computing device of claim 13 wherein the activation request from the first accessory is prompted by the attachment of a separately-housed electronic device to the first accessory.

18. The mobile computing device of claim 13 wherein the activation request from the first accessory is prompted by the detachment of a separately-housed electronic device from the first accessory.

19. The mobile computing device of claim 13 wherein the mobile computing device receives the activation request from the first accessory by detecting a toggling of an accessory detect line from the first accessory.

20. The mobile computing device of claim 13 wherein the mobile computing device receives the activation request from the first accessory by receiving a command from the first accessory.

21. The mobile computing device of claim 13 wherein the first accessory and the second accessory agree to transfer active status from the second accessory to the first accessory.

22. The mobile computing device of claim 21 wherein the mobile computing device further receives a command from the second accessory to transfer the active status to the first accessory.

* * * * *